(12) United States Patent
Pan

(10) Patent No.: US 10,015,861 B1
(45) Date of Patent: Jul. 3, 2018

(54) ADAPTIVE LED LIGHT

(71) Applicant: GUANGZHOU IETHAI LIGHTING ELECTRONIC TECHNOLOGY CO., LTD., Guangzhou (CN)

(72) Inventor: Weixiong Pan, Guangzhou (CN)

(73) Assignee: GUANGZHOU IETHAI LIGHTING ELECTRONIC TECHNOLOGY CO., LTD. (CN)

( * ) Notice: Subject to any disclaimer, the term of this patent is extended or adjusted under 35 U.S.C. 154(b) by 0 days.

(21) Appl. No.: 15/902,993

(22) Filed: Feb. 22, 2018

(30) Foreign Application Priority Data

Jan. 5, 2018 (CN) .......................... 2018 1 0010921

(51) Int. Cl.
*H05B 39/02* (2006.01)
*H05B 37/02* (2006.01)
*H05B 33/08* (2006.01)

(52) U.S. Cl.
CPC ......... *H05B 37/02* (2013.01); *H05B 33/0815* (2013.01); *H05B 33/0842* (2013.01); *Y02B 20/347* (2013.01)

(58) Field of Classification Search
CPC .... H05B 41/34; H05B 33/0803; H05B 39/09; H05B 41/28; H05B 33/0809; H05B 41/295; H05B 41/2827; H05B 41/3925; H05B 41/042; H05B 41/10; H05B 41/18; H05B 41/19; H05B 33/0815; H05B 33/0818; H05B 41/2828; H05B 41/3921; H05B 41/3927; H05B 33/0827; H05B 33/0821; Y02B 20/202; Y02B 20/204; F21Y 2101/02

See application file for complete search history.

(56) References Cited

U.S. PATENT DOCUMENTS

2015/0373790 A1* 12/2015 Boswinkel et al. . H05B 33/083
2017/0181234 A1* 6/2017 Huang et al. .......... H05B 33/08

* cited by examiner

*Primary Examiner* — Minh D A
(74) *Attorney, Agent, or Firm* — Hanley, Flight and Zimmerman, LLC

(57) ABSTRACT

The present invention discloses an adaptive LED light, comprising: a DC power supply, a first LED assembly, a second LED assembly, a first current-controlled switch, a second current-controlled switch and a first diode, wherein the first LED assembly comprises a first LED light, a first constant-current circuit and a first electrolytic capacitor; the second LED assembly comprises a second LED light, a second constant-current circuit and a second electrolytic capacitor; an input terminal of the first LED assembly is connected to a positive output terminal of the DC power supply and one terminal of the first current-controlled switch, respectively; an anode of the first diode is connected to an output terminal of the first LED assembly and one terminal of the second current-controlled switch, respectively, while a cathode thereof is connected to the other terminal of the first current-controlled switch and an input terminal of the second LED assembly, respectively; and, the other terminal of the second current-controlled switch is connected to an output terminal of the second LED assembly and a negative output terminal of the DC power supply, respectively. The LED light emits light continuously and stably, does not generate stroboflash, and has a high power factor and a low harmonic distortion.

16 Claims, 7 Drawing Sheets

ADAPTIVE LED LIGHT

This application claims priority to Chinese application number 201810010921.4, filed 5 Jan. 2018, with a title of ADAPTIVE LED LIGHT. The above-mentioned patent application is incorporated herein by reference in its entirety.

TECHNICAL FIELD

The present invention relates to the field of LEDs and in particular to an adaptive LED light.

BACKGROUND

At present, LED lights are generally driven by a switch mode power supply. Commercial power is converted into low-voltage direct current by a high-frequency switch mode power supply so as to drive LEDs to emit light. The LEDs driven by the switch mode power supply have the disadvantages of complicated circuit, many components, high cost, low reliability and large size. The introduction of the high-frequency switch mode power supply will generate electromagnetic interference and will directly influence the service life of the whole LED light. Many failures of the LED light are resulted from the power supply failure.

To solve this problem, there is a linear constant-current LED light circuit without a switch mode power supply. The voltage of an individual LED is generally about 3.2 V, which is far less than the voltage of the commercial power. Therefore, multiple LEDs are connected in series to form a high-voltage LED string so that the total voltage is close to the voltage of the commercial power, and the LEDs are allowed to operate by a current limiting circuit. As shown in FIG. 1, multiple LEDs are connected in series to form a high-voltage LED string so that the total voltage is close to the voltage of the commercial power, where the voltage of an individual LED is 3V and n individual LEDs are connected in series to form the high-voltage LED string having a voltage of (3 n)V. When the input voltage is less than Vd, the LEDs are in the off state and will not emit light; and, when the input voltage is greater than Vd, the LEDs are powered on to emit light. However, the operating voltage of the LEDs in this circuit is fluctuant, and the operating current is discontinuous. Accordingly, this circuit has the disadvantages of small current turn-on angle, obvious stroboflash of LEDs, low electrical efficiency, low harmonic distortion and low performance index.

Therefore, how to provide an LED light having long service life, no stroboflash and high power factor becomes a technical problem to be urgently solved by those skilled in the art.

SUMMARY

An objective of the present invention is to provide an adaptive LED light. The LED light emits light continuously and stably, does not generate stroboflash, and can automatically adapt to the change in periodic voltage of alternating current so that the turn-on angle of the circuit current is increased. Accordingly, the LED light has a high power factor and a low harmonic distortion.

For this purpose, the present invention provides the following solutions.

An adaptive LED light is provided, including: a DC power supply, a first LED assembly, a second LED assembly, a first current-controlled switch, a second current-controlled switch and a first diode, wherein:

the first LED assembly includes a first LED light, a first constant-current circuit and a first electrolytic capacitor, and the second LED assembly includes a second LED light, a second constant-current circuit and a second electrolytic capacitor;

an anode of the first LED light is connected to a positive output terminal of the DC power supply, a positive electrode of the first electrolytic capacitor and an input terminal of the first current-controlled switch, respectively, a cathode of the first LED light is connected to an input terminal of the first constant-current circuit, and an output terminal of the first constant-current circuit is connected to a negative electrode of the first electrolytic capacitor and an anode of the first diode; and a cathode of the first diode is connected to an output terminal of the first current-controlled switch, an anode of the second LED light and a positive electrode of the second electrolytic capacitor, respectively; a cathode of the second LED light is connected to an input terminal of the second constant-current circuit; an output terminal of the second constant-current circuit is connected to a negative output terminal of the DC power supply and a negative electrode of the second electrolytic capacitor, respectively; an input terminal of the second current-controlled switch is connected to the anode of the first diode; and an output terminal of the second current-controlled switch is connected to an output terminal of the second constant-current circuit.

Optionally, the adaptive LED light further includes n LED circuits, several second diodes and several third current-controlled switches, n being a positive integer, wherein each of the LED circuits includes the first LED component, the second LED component, the first current-controlled switch, the second current-controlled switch and the first diode;

the second diodes are arranged between the LED circuits in adjacent stages, and anodes of the second diodes are connected to an output terminal of the LED circuit in the preceding stage while cathodes thereof are connected to an input terminal of the LED circuit in the following stage;

the input terminal of the LED circuit in the first stage is connected to the positive output terminal of the DC power supply, the output terminal of the LED circuit in the $(n+1)^{th}$ stage is connected to the negative output terminal of the DC power supply, the output terminal of the LED circuit in the first stage and the input terminal of the LED circuit in the $(n+1)^{th}$ stage are connected in series to one of the third current-controlled switches, respectively, the third current-controlled switch connected to the output terminal of the LED circuit in the first stage is connected to the negative output terminal of the DC power supply, and the third current-controlled switch connected to the LED circuit in the $(n+1)^{th}$ stage is connected to the positive output terminal of the DC power supply; and the input terminal and output terminal of each intermediate LED circuit between the LED circuit in the first stage and the LED circuit in the $(n+1)^{th}$ stage are connected in series to one of the third current-controlled switches, respectively, the third current-controlled switch connected to the input terminal of this intermediate LED circuit is connected to the positive output terminal of the DC power supply, and the third current-controlled switch connected to the output terminal of this intermediate LED circuit is connected to the positive output terminal of the DC power supply.

Optionally, the adaptive LED light further includes a third LED assembly, a third diode and a fourth current-controlled switch, wherein:

the third LED assembly includes a third LED light, a third constant-current circuit and a third electrolytic capacitor, with a cathode of the third LED light being connected to the input terminal of the first constant-current circuit, an anode of the third LED light being connected to a positive electrode of the third electrolytic capacitor, and a negative electrode of the third electrolytic capacitor being connected to an output terminal of the third constant-current circuit; and the third LED assembly is connected to the LED circuit in the last stage, wherein an input terminal of the third LED assembly is connected to the cathode of the third diode and one terminal of the fourth current-controlled switch, respectively; the anode of the third diode is connected to the output terminal of the LED circuit in the adjacent preceding stage and one terminal of the fourth current-controlled switch, respectively; the other terminal of the fourth current-controlled switch connected to the anode of the third diode is connected to the negative output terminal of the DC power supply; and the other terminal of the fourth current-controlled switch connected to the input terminal of the third LED assembly is connected to the positive output terminal of the DC power supply.

Optionally, the adaptive LED light further includes a constant-current circuit or a current limiting circuit, which is connected in series to the DC power supply to limit a DC voltage signal generated by the DC power supply or keep the DC voltage signal constant.

Optionally, the adaptive LED light further includes an additional controllable constant-current source circuit, one terminal of which is connected to the positive output terminal of the DC power supply while the other terminal of which is connected to the negative output terminal of the DC power supply.

Optionally, the first current-controlled switch includes a switching bias resistor, a switching sampling resistor, a switching MOS transistor and a switching transistor; the switching bias resistor is connected across a drain of the switching MOS transistor and a gate of the MOS transistor; the drain of the switching MOS transistor is connected to the positive electrode of the first electrolytic capacitor, and the gate of the switching MOS transistor is connected to a collector of the switching transistor; a base of the switching transistor is connected to a source of the switching MOS transistor; the switching sampling resistor is connected across the base of the switching transistor and an emitter of the switching transistor; the source of the switching MOS transistor is connected to the cathode of the first diode; and, the emitter of the switching transistor is connected to the input terminal of the second LED assembly.

Optionally, the second current-controlled switch, the third current-controlled switches and/or the fourth current-controlled switch are the same as the first current-controlled switch.

Optionally, the first constant-current circuit includes a constant-current bias resistor, a constant-current sampling resistor, a constant-current MOS transistor and a constant-current transistor; one terminal of the constant-current bias resistor is connected to the anode of the first LED light, while the other terminal of the constant-current bias resistor is connected to a gate of the constant-current MOS transistor and a collector of the constant-current transistor, respectively; a drain of the constant-current MOS transistor is connected to the cathode of the first LED light, and a source of the constant-current MOS transistor is connected to a base of the constant-current transistor; the constant-current sampling resistor is connected across the base of the constant-current transistor and an emitter of the constant-current transistor; and, the emitter of the constant-current transistor is connected to the positive electrode of the first electrolytic capacitor. Optionally, the second constant-current circuit and/or the third constant-current circuit are the same as the first constant-current circuit.

In accordance to the specific embodiments of the present invention, the present invention has the following technical effects.

The LED light of the present invention does not need any switch mode power supply. Based on a common linear constant current circuit, energy storage capacitors and constant-current circuits for increasing the turn-angle of LEDs and improving the power factor of the circuit are additionally provided. Accordingly, the problems of low efficiency, high stroboflash, low power factor and high harmonic distortion of the common linear constant current circuit are solved, and the effect of driving by a switch mode power supply is achieved by the LED light in a linear constant current manner. Moreover, the problems of high failure rate, serious electromagnetic interference and the like when the LED light is driven by a switch mode power supply can also be overcome. Since there are no magnetic elements such as high-frequency transformers in the switch mode power supply, the circuit is simple. SMT elements and LED beads can be mounted on an aluminum substrate, so that the light is small in size and more flexible in design.

BRIEF DESCRIPTION OF THE DRAWING

To describe the technical solutions in the embodiments of the present invention or in the prior art more clearly, the drawings to be used in the description of the embodiments will be briefly described below. Apparently, the drawings described hereinafter are some of the embodiments of the present invention, and a person of ordinary skill in the art can obtain other drawings according to these drawings without paying any creative effort.

DETAILED DESCRIPTION

The technical solutions in the embodiments of the present invention will be clearly and completely described below with reference to the accompanying drawings in the embodiments of the present invention. Apparently, the embodiments described herein are merely a part but not all of the embodiments of the present invention. All other embodiments obtained by a person of ordinary skill in the art without paying any creative effort on the basis of the embodiments in the present invention shall fall into the protection scope of the present invention.

An objective of the present invention is to provide an adaptive LED light. The LED light emits light continuously and stably, does not generate stroboflash, and can automatically adapt to the change in periodic voltage of the Alternating current so that the turn-on angle of the circuit current is increased. Accordingly, the LED light has a high power factor and a low harmonic distortion.

Figure 1:
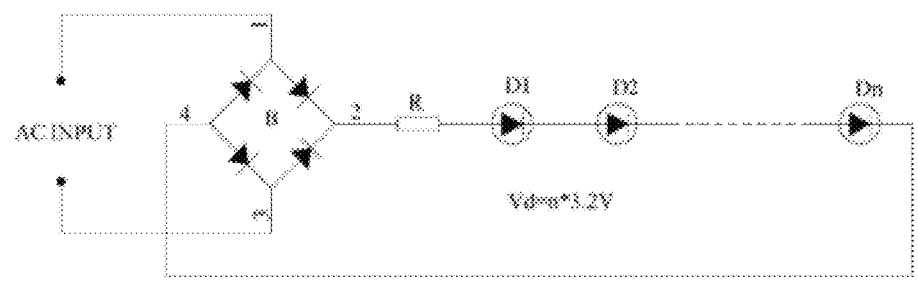
FIG. 1 is a diagram of an existing LED driving circuit.
Figure 2:
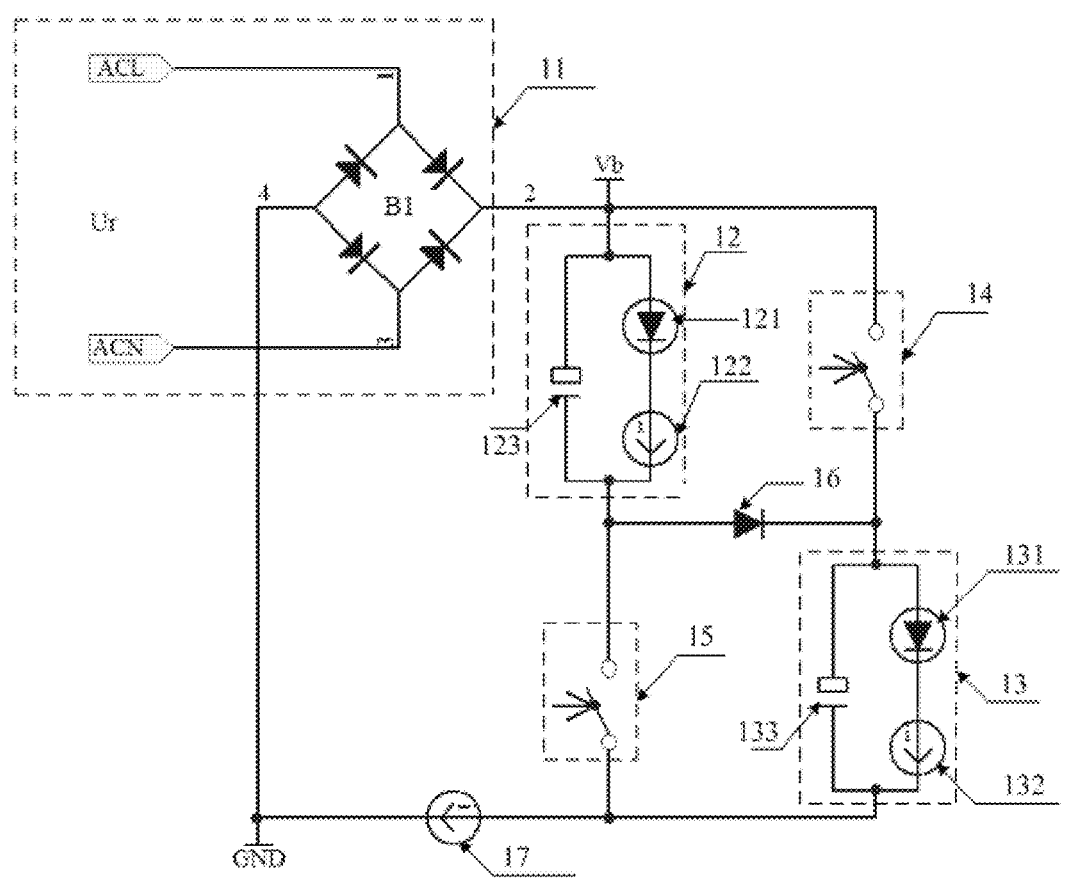
FIG. 2 is a schematic diagram of a two-order adaptive LED light according to the present invention.

FIG. 2 is a schematic diagram of a two-order adaptive LED light according to the present invention. As shown in FIG. 2, an adaptive LED light is provided, including: a DC power supply 11, a first LED assembly 12, a second LED assembly 13, a first current-controlled switch 14, a second current-controlled switch 16 and a first diode 16, wherein:

the first LED assembly 12 includes a first LED light 121, a first constant-current circuit 122 and a first electrolytic capacitor 123, and the second LED assembly 13 includes a second LED light 131, a second constant-current circuit 132 and a second electrolytic capacitor 133;

an anode of the first LED light 121 is connected to a positive output terminal of the DC power supply 11, a positive electrode of the first electrolytic capacitor 123 and an input terminal of the first current-controlled switch 14, respectively, a cathode of the first LED light 121 is connected to an input terminal of the first constant-current circuit 122, and an output terminal of the first constant-current circuit 122 is connected to a negative electrode of the first electrolytic capacitor 123 and an anode of the first diode 16; and a cathode of the first diode 16 is connected to an output terminal of the first current-controlled switch 14, an anode of the second LED light 131 and a positive electrode of the second electrolytic capacitor 133, respectively, a cathode of the second LED light 131 is connected to an input terminal of the second constant-current circuit 132, an output terminal of the second constant-current circuit 132 is connected to a negative output terminal of the DC power supply 11 and a negative electrode of the second electrolytic capacitor 133, respectively, an input terminal of the second current-controlled switch 15 is connected to the anode of the first diode 16, and an output terminal of the second current-controlled switch 15 is connected to an output terminal of the second constant-current circuit 132.

In this embodiment, the adaptive LED light further includes a constant-current circuit 17 or a current limiting circuit 17, which is connected in series to the DC power supply 11 to limit a DC voltage signal generated by the DC power supply 11 or keep the DC voltage signal constant.

In this embodiment, the DC power supply 11 is a bridge rectifier, and the commercial power is rectified into fluctuating DC current by the bridge rectifier. The first constant-current circuit 122, the second constant-current circuit 132 and the constant-current circuit (current limiting circuit) 17 are specially designed constant-current source circuits.

The working principle of the adaptive LED light provided in this embodiment is as follows.

Both the first LED light 121 and the second LED light 131 have a forward voltage of Vf, and it is designed that 2*Vf is slightly greater than the effective voltage value of the commercial power but less than the peak of the commercial power. The first current-controlled switch 14 and the second current-controlled switch 15 are specially-designed controlled switches. The state of the controlled switch is controlled by the current flowing through a sampling resistor. When the current is small, the switch is turned on; and, the current is large, the switch is turned off. The trigger current for turning off the first current-controlled switch 14 and the second current-controlled switch 15 is less than the current of the constant-current circuit 17. The first constant-current circuit 122 and the second constant-current circuit 132 determine the operating current of the LED lights that are connected in series thereto. The constant current of the constant-current circuit 17 is greater than the trigger current for turning off the first current-controlled switch 14 and the second current-controlled switch 15. The first electrolytic capacitor 123 and the second electrolytic capacitor 133 store power at a high voltage and discharge at a low voltage.

The fluctuating DC voltage Vb rectified by the bridge rectifier changes according to the positive half circle of the sine wave. Within each period, the voltage changes from 0 to a peak and then from the peak to 0. At a low voltage Vb, the circuit current is small, and the first current-controlled switch 14 and the second current-controlled switch 15 are triggered to be turned on. While at a high voltage Vb, the circuit current is large, and the first current-controlled switch 14 and the second current-controlled switch 15 are triggered to be turned off. The connection relationship between the first LED assembly 12 and the second LED assembly 13 in the circuit is related to the magnitude of the voltage Vb. At a low voltage Vb, the first LED assembly 12 and the second LED assembly 13 are connected in parallel; and at a high voltage, the first LED assembly 12 and the second LED assembly 13 are connected in series.

The working process of the adaptive LED light provided in this embodiment will be specifically described below.

Figure 3:
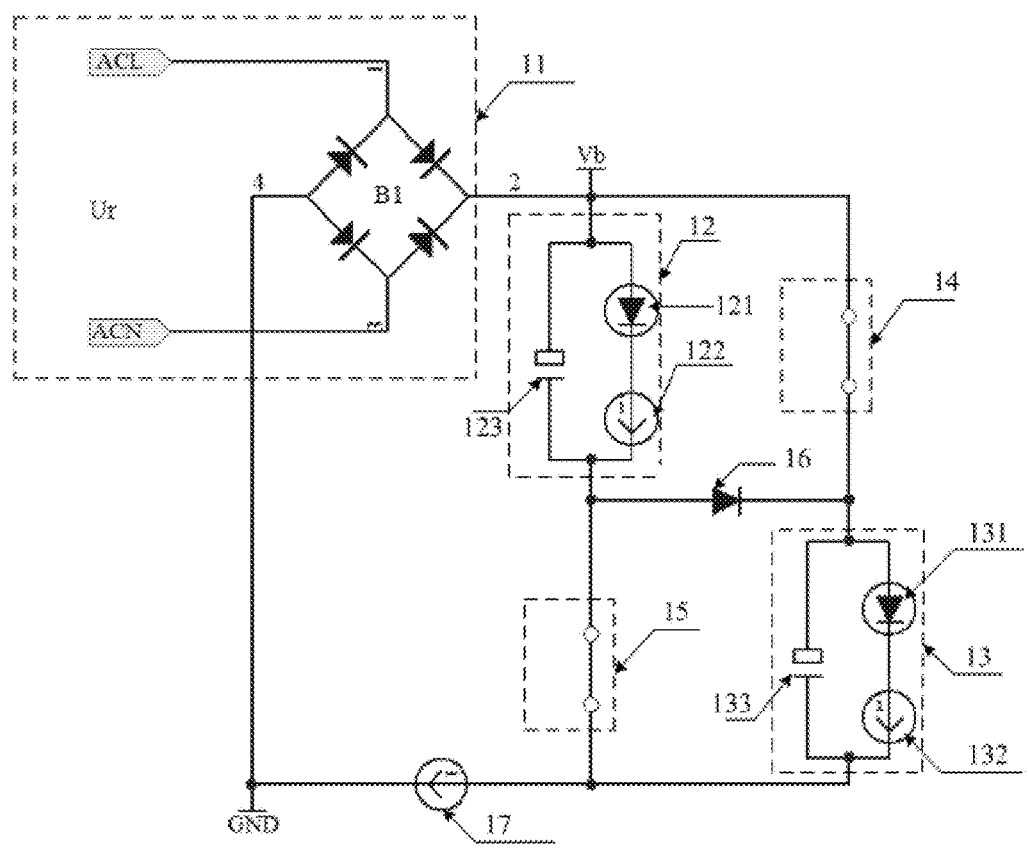
FIG. 3 is an equivalent circuit diagram of the two-order adaptive LED light when Vb is less than 2*Vf, according to the present invention.

FIG. 3 is an equivalent circuit diagram of the two-order adaptive LED light when Vb is less than 2*Vf, according to the present invention. As shown in FIG. 3, when Vb is less than 2*Vf, the first current-controlled switch 14 and the second current-controlled switch 15 are turned on, and the first diode 16 is reversely biased, equivalently in a turned-off state. The first LED assembly 12 and the second LED assembly 13 are connected in parallel.

When Vb is less than Vf, the first current-controlled switch 14 and the second current-controlled switch 15 are turned on, and the first diode 16 is reversely biased, equivalently in a turned-off state. The first LED assembly 12 and the second LED assembly 13 are connected in parallel. The first electrolytic capacitor 123 discharges to drive the first LED light 121 to emit light, and the second electrolytic capacitor 133 discharges to drive the second LED light 131 to emit light.

When Vb is greater than Vf but less than 2*Vf, the first current-controlled switch 14 and the second current-controlled switch 15 are turned on, and the first diode 16 is reversely biased, equivalently in a turned-off state. The first LED assembly 12 and the second LED assembly 13 are connected in parallel. The DC power supply 11 drives the first LED light 121 and the second LED light 131 to emit light, and charges the first electrolytic capacitor 123 and the second electrolytic capacitor 133. The first constant-current 122 and the second constant-current 132 ensure the operating current of the first LED light 121 and the operating current of the second LED light 131 to be within a rated range, so that the LED light operates normally.

Figure 4:
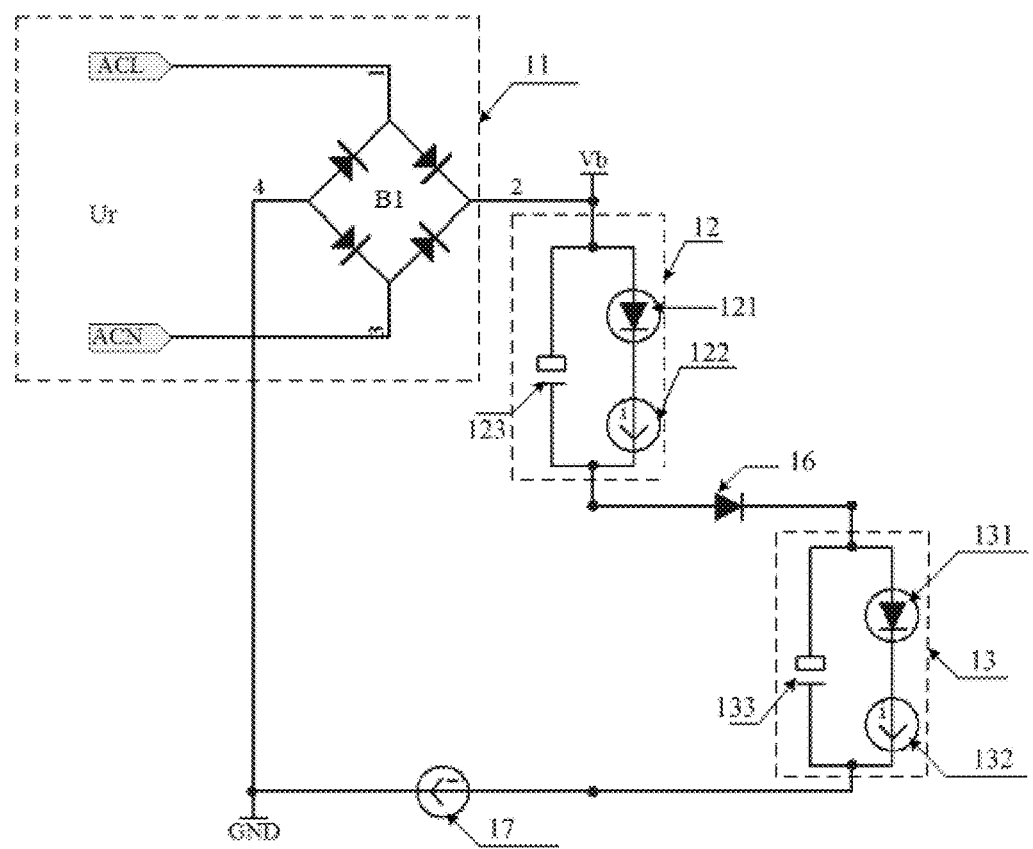
FIG. 4 is an equivalent circuit diagram of the two-order adaptive LED light when Vb is greater than 2*Vf, according to the present invention.

FIG. 4 is an equivalent circuit diagram of the two-order adaptive LED light when Vb is greater than 2*Vf, according to the present invention. As shown in FIG. 4, when Vb is greater than 2*Vf, the first current-controlled switch 14 and the second current-controlled switch 15 are turned off, and the first diode 16 is forward biased. The first LED assembly 12 and the second LED assembly 13 are connected in series.

Since the voltage Vb is greater than 2*Vf, the DC power supply 11 drives the first LED light 121 and the second LED light 131 to emit light, and charges the first electrolytic capacitor 123 and the second electrolytic capacitor 133. The constant-current circuit 17 limits the maximum current of the circuit and thus avoids damage due to overcurrent.

Figure 5:
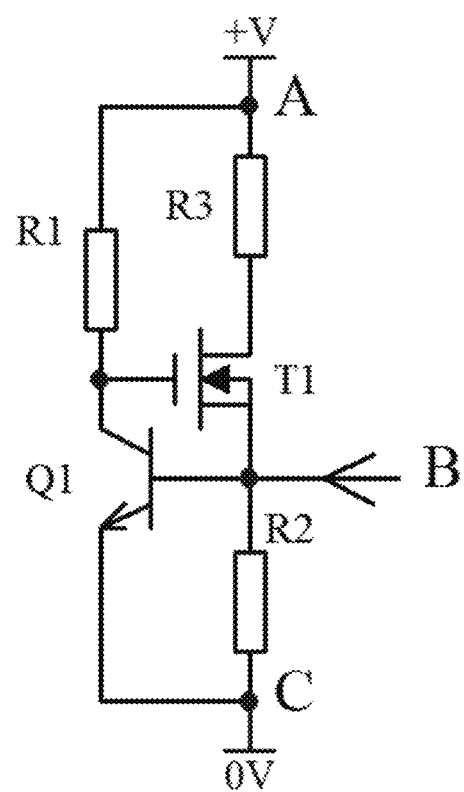
FIG. 5 is a circuit diagram of a special constant-current circuit and a controlled switch.

FIG. 5 is a circuit diagram of a special constant-current circuit and a controlled switch. The working principle of the special constant-current circuit and the controlled switch shown in FIG. 5 is as follows.

T1 is an N-channel MOS transistor, Q1 is an NPN transistor, R1 is a bias resistor for providing a gate bias voltage to T1, R2 is a current sampling resistor, and R3 is a load which can be a resistor or an LED light. The current flowing through the load R3 also flows through the T1 and the sampling resistor R2. The voltage drop on the sampling resistor is also a bias voltage of the transistor Q1. The Q1 and T1 form a negative feedback circuit to stabilize the voltage drop on the R2 so as to stabilize the current of the load R3. In this way, a constant-current source circuit is formed.

The working process of the constant-current circuit is as follows.

When the voltage from A to C rises→the current of the load R3 increases→the voltage drop on the R2 also increases→the working point of the Q1 rises→the voltage at the collector of the Q1 decreases→the bias voltage of the T1 decreases→the internal resistance of the T1 increases→the current of the load R3 decreases. The current of the load R3 is stabilized by this closed-loop negative feedback process.

Meanwhile, the circuit shown in FIG. 5 can also be a current-controlled switch. When no external current flows from the point B to the point C, the operating state of the constant-current source in the circuit will not be influenced. When an external current flows through the point B and the point C and if the current is enough to realize an enough high voltage drop on the R2 so as to enable the Q1 to be completely turned on or saturated, the voltage at the gate of the T1 is lowered by the Q1, so that the T1 is turned off. Therefore, the switch circuit can be controlled to be in a turned-off state or a turned-on state by controlling the injected current at the point B.

Figure 6:
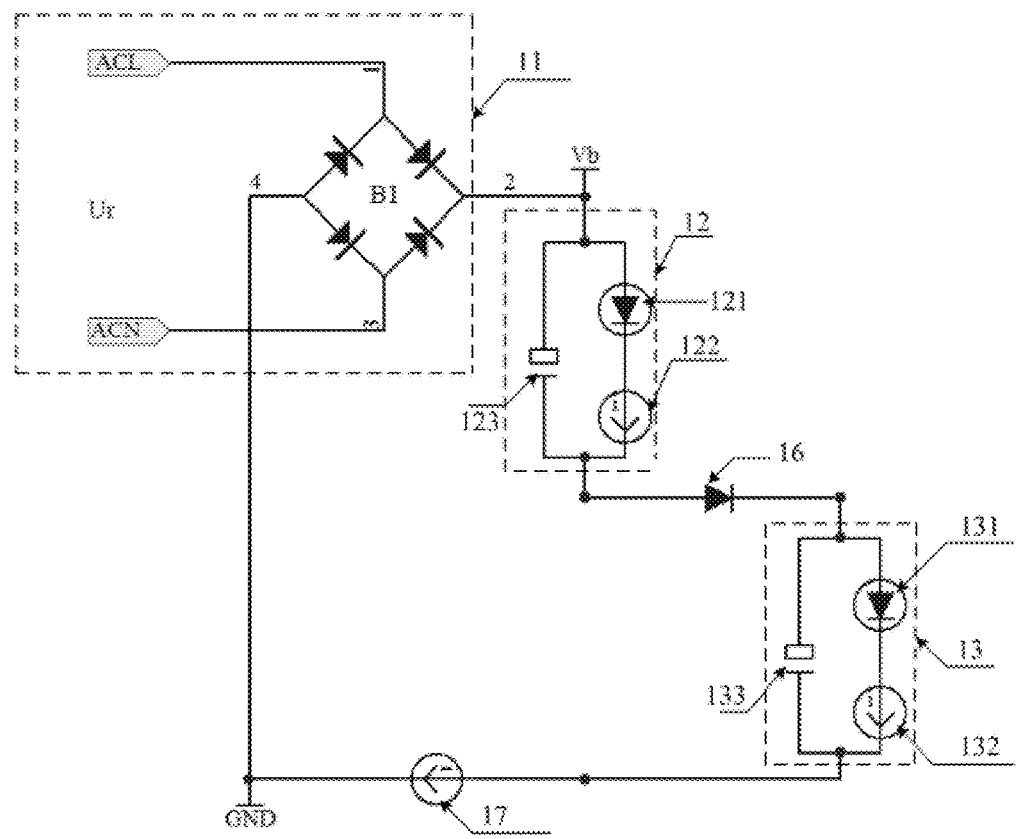
FIG. 6 is a circuit diagram of the two-order adaptive LED light according to the present invention.

FIG. 6 is a circuit diagram of the two-order adaptive LED light according to the present invention. As shown in FIG. 6, this embodiment provides a two-order circuit. R1, T1, Q1 and R2 form a first constant-current circuit 122 of the constant-current source for determining the operating current of the first LED light 121, and T2, Q2, R3 and R4 form a first current-controlled switch 14. T3, Q3, R5 and R6 form a second constant-current circuit 132 for determining the operating current of the second LED light 131. T4, Q4, R7 and R8 form a second current-controlled switch 15. T5, Q5, R9 and R10 form a constant-current circuit 17.

Specifically, the first current-controlled switch 14 includes a switching bias resistor R3, a switching sampling resistor R4, a switching MOS transistor T2 and a switching transistor Q2, wherein the switching bias resistor R3 is connected across a drain of the switching MOS transistor T2 and a gate of the MOS transistor T2; the drain of the switching MOS transistor T2 is connected to the positive electrode of the first electrolytic capacitor 123, and the gate of the switching MOS transistor T2 is connected to a collector of the switching transistor Q2; a base of the switching transistor Q2 is connected to a source of the switching MOS transistor T2; the switching sampling resistor R4 is connected across the base of the switching transistor Q2 and an emitter of the switching transistor Q2; the source of the switching MOS transistor T2 is connected to the cathode of the first diode 16; and, the emitter of the switching transistor Q2 is connected to the input terminal of the second LED assembly 13. The circuit of the second current-controlled switch 15 is the same as that of the first current-controlled switch 14.

Specifically, the first constant-current circuit 122 includes a constant-current bias resistor R1, a constant-current sampling resistor R2, a constant-current MOS transistor T1 and a constant-current transistor Q1, wherein one terminal of the constant-current bias resistor R1 is connected to the anode of the first LED light 121, while the other terminal of the constant-current bias resistor R1 is connected to a gate of the constant-current MOS transistor T1 and a collector of the constant-current transistor Q1, respectively; a drain of the constant-current MOS transistor T1 is connected to the cathode of the first LED light 121, and a source of the constant-current MOS transistor T1 is connected to a base of the constant-current transistor Q1; the constant-current sampling resistor R2 is connected across the base of the constant-current transistor Q1 and an emitter of the constant-current transistor Q1; and, the emitter of the constant-current transistor Q1 is connected to the positive electrode of the first electrolytic capacitor 123. As shown in FIG. 6, the circuit of the second constant-current circuit 132 and the circuit of the constant-current circuit 17 are the same as that of the first constant-current circuit 122.

Figure 7:
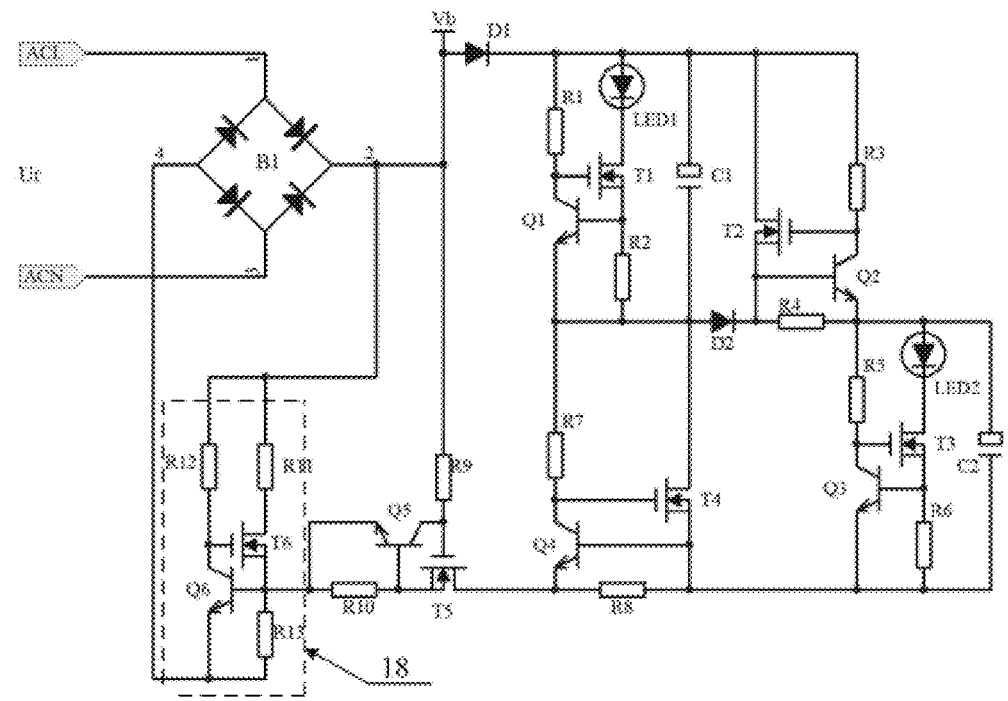
FIG. 7 is a circuit diagram of the two-order adaptive LED light with an additional controllable constant-current source circuit.

FIG. 7 is a circuit diagram of the two-order adaptive LED light with an additional controllable constant-current source circuit. As shown in FIG. 7, the adaptive LED light further includes an additional controllable constant-current source circuit 18, one terminal of which is connected to the positive output terminal of the DC power supply 11 while the other terminal of which is connected to the negative output terminal of the DC power supply 11.

As shown in FIG. 7, the additional controllable constant-current source circuit 18 includes T6, Q6, R11, R12 and R13 and is used for increasing the turn-on angle of the circuit current and improving the power factor. When the output voltage Vb of the DC power supply 11 is less than Vf, no current flows through T2, T4 and T5, and the additional controllable constant-current source circuit 18 generates current in the circuit, so that the turn-on angle of the current is increased, the power factor is improved and the harmonic distortion is reduced. When the voltage is increased to turn on the T2, T4 or T5 and allow the current to flow through the current sampling resistor R13 of the additional controllable constant-current source circuit 18, the T6 will be turned off and will not consume power, so that the T6 can realize the effect of improving the power factor of the circuit, without consuming excessive power.

In the LED light provided in this embodiment, the topological structure (serial connection or parallel connection) of the LED lights can be changed according to the change rule of the alternating current, so that the LED lights can adapt to the change in magnitude of the AC voltage, and the total voltage of the LED lights is close to the power supply voltage. Accordingly, the voltage drop and power consumption on the constant-current circuit are reduced, and the efficiency of the LED lights is improved. When the output voltage of the DC power supply is high, the LED lights are driven to operate and charge the electrolytic capacitors; and, when the output voltage of the DC power supply is low, the electrolytic capacitors discharge to drive the LED lights to emit light. The first constant-current circuit 122 and the second constant-current circuit 132 make the current flowing through the first LED light 121 and the second LED light 131 constant and not fluctuate, so that the adaptive LED light emits light continuously and stably and will not generate stroboflash. The adaptive LED light provided in this embodiment can automatically adapt to the periodic voltage change of the alternating current. In comparison with the simple linear constant-current circuit, the turn-on angle of the circuit current is increased, the power factor is improved and the harmonic distortion is reduced.

In this embodiment, the two-order circuit having two groups of LED lights and two electrolytic capacitors. In a similar way, there may be a three-order, four-order or higher-order LED circuit consisting of three, four or more groups of LED lights and a corresponding number of electrolytic capacitors, constant-current circuits and controlled switches. When the order is higher, the voltage of each group of LEDs is lower, the turn-on angle of the circuit current is larger, the power factor is higher and the harmonic distortion of the circuit is lower. Therefore, in practical applications, the performance of the LED light can be further improved by increasing the order of the circuit as required.

Figure 8:
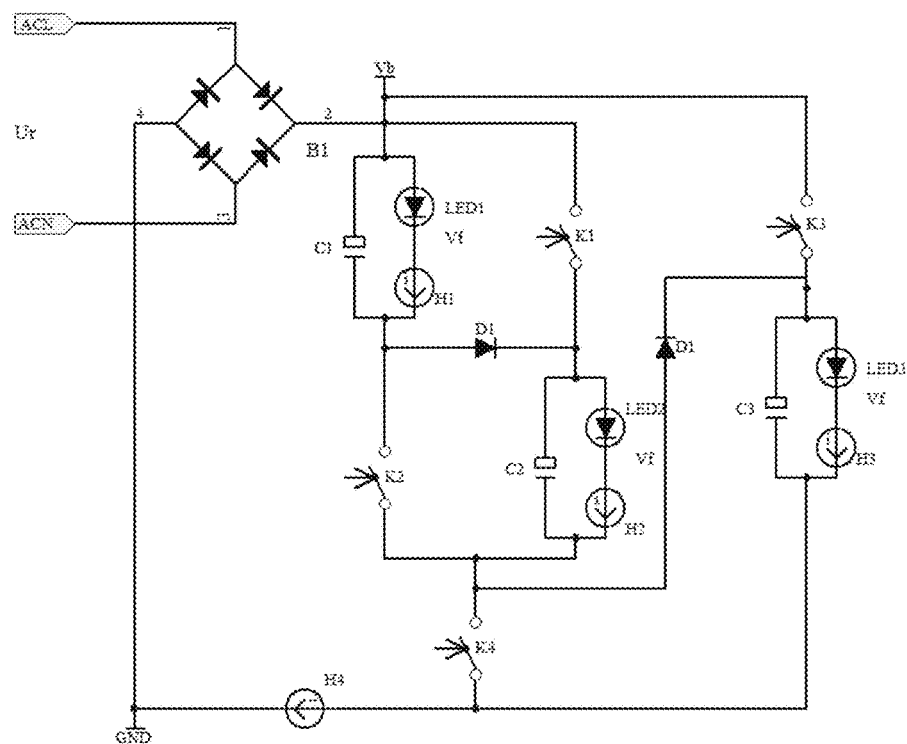
FIG. 8 is a schematic circuit diagram of a three-order adaptive LED light.
Figure 9:
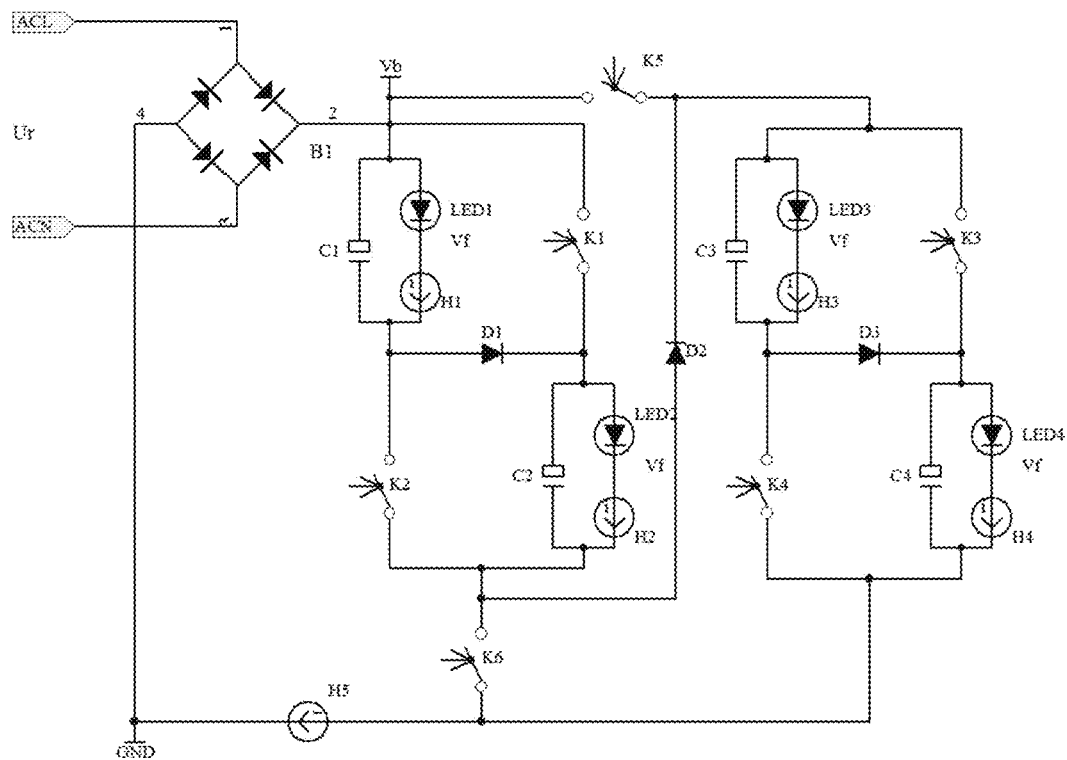
FIG. 9 is a schematic circuit diagram of a four-order adaptive LED light.

Based on the two-order circuit, various high-order circuits can be formed. FIG. 8 is a schematic circuit diagram of a three-order adaptive LED light. FIG. 9 is a schematic circuit diagram of a four-order adaptive LED light.

The working process of the three-order adaptive LED light is as follows.

1. The output voltage Vb of the DC power supply 11 changes according to the positive half circle rule of the sine wave. When Vb is less than Vf, the circuit current is small, K1 to K4 are turned on, and the electrolytic capacitors C1, C2 and C3 discharge to drive LED1, LED2 and LED3 to emit light through constant-current sources H1, H2 and H3, respectively.

2. When Vb is greater than Vf but less than 2*Vf, the circuit current is small, K1 to K4 are turned on, LED1, LED2 and LED3 are connected in parallel, and the Vb can drive the three LEDs to operate and charge the three electrolytic capacitors.

3. When Vb is greater than 2*Vf but less than 3*Vf, the circuit current rises, the circuit is controlled to turn off K3 and K4 and turn on K1 and K2, and the LED1 and LED2 are connected in parallel and then connected in series to the LED3. In this case, the total voltage of LEDs in the circuit is 2*Vf, and the Vb can continuously drive the LEDs to operate and charge the electrolytic capacitors.

4. When Vb is greater than 3*Vf, the circuit current rises continuously, the circuit is controlled to turn off K1 to K4, and the LED1, LED2 and LED3 are connected in series. In this case, the total voltage of LEDs in the circuit is 3*Vf, and the Vb can still continuously drive the LEDs to operate and charge the electrolytic capacitors.

5. The voltage drop process is an inverse process of the above working process, and will not be repeated here.

The working process of the four-order adaptive LED light is as follows.

1. The output voltage Vb of the DC power supply 11 changes according to the positive half circle rule of the sine wave. When Vb is less than Vf, the circuit current is small, K1 to K6 are turned on, and the electrolytic capacitors C1, C2, C3 and C4 discharge to drive LED1, LED2, LED3 and LED4 to emit light through constant-current sources H1, H2, H3 and H4, respectively.

2. When Vb is greater than Vf but less than 2*Vf, the circuit current is small, K1 to K6 are turned on, LED1, LED2, LED3 and LED4 are connected in parallel, and the Vb can drive the four LEDs to operate and charge the four electrolytic capacitors.

3. When Vb is greater than 2*Vf but less than 3*Vf, the circuit current rises, the circuit is controlled to turn off K5 and K6 and turn on K1 to K4, the LED1 and LED2 are connected in parallel to form a first parallel branch, LED3 and LED4 are connected in parallel to form a second parallel branch, and the first parallel branch and the second parallel branch are connected in series via D2. In this case, the total voltage of LEDs in the circuit is 2*Vf, and the Vb can continuously drive the LEDs to operate and charge the electrolytic capacitors.

4. When Vb is greater than 3*Vf but less than 4*Vf, the circuit current rises, the circuit is controlled to turn off K1, K2, K5 and K6 and turn on K3 and K4, and the LED1 and LED2 are connected in series via D1 and then connected in series via D2 to a parallel circuit formed by LED3 and LED4. In this case, the total voltage of LEDs in the circuit is 3*Vf, and the Vb can still continuously drive the LEDs to operate and charge the electrolytic capacitors.

5. When Vb is greater than 4*Vf, the circuit current rises continuously, the circuit is controlled to turn off K1 to K6, and the LED1, LED2, LED3 and LED4 are connected in series via D1, D2 and D3. In this case, the total voltage of LEDs in the circuit is 4*Vf, and the Vb can still continuously drive the LEDs to operate and charge the electrolytic capacitors.

6. The voltage drop process is an inverse process of the above working process, and will not be repeated here.

Therefore, the high-order adaptive LED light provided in this embodiment can change the serial/parallel connection state of the LEDs according to the sinusoidal change rule of the voltage and thus adapt to the change in the DV voltage, so that the total voltage of LEDs is close to the power supply voltage. Accordingly, the voltage drop and power consumption on the constant-current circuit are reduced, and the efficiency is improved. By charging/discharging the electrolytic capacitors and by using the constant-current circuit, the operating current of the LEDs remains stable, and the LEDs stably emit light and do not generate stroboflash. Meanwhile, since the voltage of a single LED string is lower, the turn-on angle of the circuit current is larger, the power factor is higher, and the harmonic distortion of the circuit is lower.

The embodiments of the present invention have been described progressively, the focus of each embodiment is different from that of other embodiments, and the identical or similar portions of the embodiments can be referred together.

Although the principle and implementations of the present invention have been described above by specific instances in the present invention, the foregoing description of the embodiments is merely for helping in understanding the method and core idea of the present invention. Meanwhile, various alterations to the specific implementations and applications may come to a person of ordinary skill in the art according to the concept of the present invention. In conclusion, the contents of the description shall not be regarded as limitations to the present invention.

What is claimed is:

1. An adaptive LED light, comprising: a DC power supply, a first LED assembly, a second LED assembly, a first current-controlled switch, a second current-controlled switch and a first diode, wherein:
the first LED assembly comprises a first LED light, a first constant-current circuit and a first electrolytic capacitor, and the second LED assembly comprises a second LED light, a second constant-current circuit and a second electrolytic capacitor;

an anode of the first LED light is connected to a positive output terminal of the DC power supply, a positive electrode of the first electrolytic capacitor and an input terminal of the first current-controlled switch, respectively, a cathode of the first LED light is connected to an input terminal of the first constant-current circuit, and an output terminal of the first constant-current circuit is connected to a negative electrode of the first electrolytic capacitor and an anode of the first diode; and a cathode of the first diode is connected to an output terminal of the first current-controlled switch, an anode of the second LED light and a positive electrode of the second electrolytic capacitor, respectively; a cathode of the second LED light is connected to an input terminal of the second constant-current circuit; an output terminal of the second constant-current circuit is connected to a negative output terminal of the DC power supply and a negative electrode of the second electrolytic capacitor, respectively; an input terminal of the second current-controlled switch is connected to the anode of the first diode; and an output terminal of the second current-controlled switch is connected to an output terminal of the second constant-current circuit.

2. The adaptive LED light according to claim 1, further comprising n LED circuits, several second diodes and several third current-controlled switches, n being a positive integer, wherein each of the LED circuits comprises the first LED assembly, the second LED assembly, the first current-controlled switch, the second current-controlled switch and the first diode;

the second diodes are arranged between the LED circuits in adjacent stages, and anodes of the second diodes are connected to an output terminal of the LED circuit in the preceding stage while cathodes thereof are connected to an input terminal of the LED circuit in the following stage;

the input terminal of the LED circuit in the first stage is connected to the positive output terminal of the DC power supply, the output terminal of the LED circuit in the $(n+1)^{th}$ stage is connected to the negative output terminal of the DC power supply, the output terminal of the LED circuit in the first stage and the input terminal of the LED circuit in the $(n+1)^{th}$ stage are connected in series to one of the third current-controlled switches, respectively, the third current-controlled switch connected to the output terminal of the LED circuit in the first stage is connected to the negative output terminal of the DC power supply, and the third current-controlled switch connected to the LED circuit in the $(n+1)^{th}$ stage is connected to the positive output terminal of the DC power supply; and the input terminal and output terminal of each intermediate LED circuit between the LED circuit in the first stage and the LED circuit in the $(n+1)^{th}$ stage are connected in series to one of the third current-controlled switches, respectively, the third current-controlled switch connected to the input terminal of this intermediate LED circuit is connected to the positive output terminal of the DC power supply, and the third current-controlled switch connected to the output terminal of this intermediate LED circuit is connected to the positive output terminal of the DC power supply.

3. The adaptive LED light according to claim 2, further comprising a third LED assembly, a third diode and a fourth current-controlled switch, wherein:

the third LED assembly comprises a third LED light, a third constant-current circuit and a third electrolytic capacitor, with a cathode of the third LED light being connected to the input terminal of the first constant-current circuit, an anode of the third LED light being connected to a positive electrode of the third electrolytic capacitor, and a negative electrode of the third electrolytic capacitor being connected to an output terminal of the third constant-current circuit; and the third LED assembly is connected to the LED circuit in the last stage, wherein an input terminal of the third LED assembly is connected to the cathode of the third diode and one terminal of the fourth current-controlled switch, respectively; the anode of the third diode is connected to the output terminal of the LED circuit in the adjacent preceding stage and one terminal of the fourth current-controlled switch, respectively; the other terminal of the fourth current-controlled switch connected to the anode of the third diode is connected to the negative output terminal of the DC power supply; and the other terminal of the fourth current-controlled switch connected to the input terminal of the third LED assembly is connected to the positive output terminal of the DC power supply.

4. The adaptive LED light according to claim 3, further comprising a constant-current circuit or a current limiting circuit, which is connected in series to the DC power supply to limit a DC voltage signal generated by the DC power supply or keep the DC voltage signal constant.

5. The adaptive LED light according to claim 3, further comprising an additional controllable constant-current source circuit, one terminal of which is connected to the positive output terminal of the DC power supply while the other terminal of which is connected to the negative output terminal of the DC power supply.

6. The adaptive LED light according to claim 3, wherein the first current-controlled switch comprises a switching bias resistor, a switching sampling resistor, a switching MOS transistor and a switching transistor; the switching bias resistor is connected across a drain of the switching MOS transistor and a gate of the MOS transistor; the drain of the switching MOS transistor is connected to the positive electrode of the first electrolytic capacitor, and the gate of the switching MOS transistor is connected to a collector of the switching transistor; a base of the switching transistor is connected to a source of the switching MOS transistor; the switching sampling resistor is connected across the base of the switching transistor and an emitter of the switching transistor; the source of the switching MOS transistor is connected to the cathode of the first diode; and, the emitter of the switching transistor is connected to the input terminal of the second LED assembly.

7. The adaptive LED light according to 6, wherein the second current-controlled switch, the third current-controlled switches and/or the fourth current-controlled switch are the same as the first current-controlled switch.

8. The adaptive LED light according to 3, wherein the first constant-current circuit comprises a constant-current bias resistor, a constant-current sampling resistor, a constant-current MOS transistor and a constant-current transistor; one terminal of the constant-current bias resistor is connected to the anode of the first LED light, while the other terminal of the constant-current bias resistor is connected to a gate of the constant-current MOS transistor and a collector of the constant-current transistor, respectively; a drain of the constant-current MOS transistor is connected to the cathode of the first LED light, and a source of the constant-current MOS transistor is connected to a base of the constant-current transistor; the constant-current sampling resistor is connected across the base of the constant-current transistor and an emitter of the constant-current transistor; and, the emitter of the constant-current transistor is connected to the positive electrode of the first electrolytic capacitor.

9. The adaptive LED light according to 8, wherein the second constant-current circuit and/or the third constant-current circuit are the same as the first constant-current circuit.

10. The adaptive LED light according to claim 1, further comprising a third LED assembly, a third diode and a fourth current-controlled switch, wherein:
the third LED assembly comprises a third LED light, a third constant-current circuit and a third electrolytic capacitor, with a cathode of the third LED light being connected to the input terminal of the first constant-current circuit, an anode of the third LED light being connected to a positive electrode of the third electrolytic capacitor, and a negative electrode of the third electrolytic capacitor being connected to an output terminal of the third constant-current circuit; and
the third LED assembly is connected to the LED circuit in the last stage, wherein an input terminal of the third LED assembly is connected to the cathode of the third diode and one terminal of the fourth current-controlled switch, respectively; the anode of the third diode is connected to the output terminal of the LED circuit in the adjacent preceding stage and one terminal of the fourth current-controlled switch, respectively; the other terminal of the fourth current-controlled switch connected to the anode of the third diode is connected to the negative output terminal of the DC power supply; and the other terminal of the fourth current-controlled switch connected to the input terminal of the third LED assembly is connected to the positive output terminal of the DC power supply.

11. The adaptive LED light according to claim 10, further comprising a constant-current circuit or a current limiting circuit, which is connected in series to the DC power supply to limit a DC voltage signal generated by the DC power supply or keep the DC voltage signal constant.

12. The adaptive LED light according to claim 10, further comprising an additional controllable constant-current source circuit, one terminal of which is connected to the positive output terminal of the DC power supply while the other terminal of which is connected to the negative output terminal of the DC power supply.

13. The adaptive LED light according to claim 10, wherein the first current-controlled switch comprises a switching bias resistor, a switching sampling resistor, a switching MOS transistor and a switching transistor; the switching bias resistor is connected across a drain of the switching MOS transistor and a gate of the MOS transistor; the drain of the switching MOS transistor is connected to the positive electrode of the first electrolytic capacitor, and the gate of the switching MOS transistor is connected to a collector of the switching transistor; a base of the switching transistor is connected to a source of the switching MOS transistor; the switching sampling resistor is connected across the base of the switching transistor and an emitter of the switching transistor; the source of the switching MOS transistor is connected to the cathode of the first diode; and, the emitter of the switching transistor is connected to the input terminal of the second LED assembly.

14. The adaptive LED light according to 13, wherein the second current-controlled switch, the third current-controlled switches and/or the fourth current-controlled switch are the same as the first current-controlled switch.

15. The adaptive LED light according to 10, wherein the first constant-current circuit comprises a constant-current bias resistor, a constant-current sampling resistor, a constant-current MOS transistor and a constant-current transistor; one terminal of the constant-current bias resistor is connected to the anode of the first LED light, while the other terminal of the constant-current bias resistor is connected to a gate of the constant-current MOS transistor and a collector of the constant-current transistor, respectively; a drain of the constant-current MOS transistor is connected to the cathode of the first LED light, and a source of the constant-current MOS transistor is connected to a base of the constant-current transistor; the constant-current sampling resistor is connected across the base of the constant-current transistor and an emitter of the constant-current transistor; and, the emitter of the constant-current transistor is connected to the positive electrode of the first electrolytic capacitor.

16. The adaptive LED light according to 15, wherein the second constant-current circuit and/or the third constant-current circuit are the same as the first constant-current circuit.

* * * * *